Dec. 17, 1946.    J. K. NORTHROP ET AL    2,412,647
AIRCRAFT
Filed Aug. 8, 1944    3 Sheets-Sheet 1

JOHN K. NORTHROP
WILLIAM R. SEARS
INVENTORS

BY *Lippincott + Metcalf*
ATTORNEYS

Dec. 17, 1946.    J. K. NORTHROP ET AL    2,412,647
AIRCRAFT
Filed Aug. 8, 1944    3 Sheets-Sheet 2

JOHN K. NORTHROP
WILLIAM R. SEARS
*INVENTORS*

BY *Lippincott + Metcalf*
*ATTORNEYS*

JOHN K. NORTHROP
WILLIAM R. SEARS
INVENTORS

BY Lippincott & Metcalf
ATTORNEYS

Patented Dec. 17, 1946

2,412,647

UNITED STATES PATENT OFFICE 2,412,647

AIRCRAFT

John K. Northrop, Los Angeles, and William R. Sears, Inglewood, Calif., assignors to Northrop Aircraft, Inc., Hawthorne, Calif., a corporation of California Application August 8, 1944, Serial No. 548,586

4 Claims. (Cl. 244—13)

This invention relates generally to aircraft of the all-wing or tailless type, and more particularly to devices for reducing the landing speed of such airplanes.

The present application is a continuation-in-part of our original application, entitled Airplane, filed February 23, 1942, Serial No. 432,016. See our application entitled Airplane, Serial No. 547,594, filed August 1, 1944, which is a continuation-in-part of said original application Serial No. 432,016. Our said original application Serial No. 432,016 was addressed to the broad problem of reducing the landing speed of tailless airplanes. Since the elevators of such airplanes usually consist of control surfaces incorporated in the trailing edge of the wing, their upward deflection in trimming the airplane for landing seriously diminishes the lift coefficient of the wing, with the result that landing speed tends to become excessive. Our above mentioned original application disclosed two means by which this excessive landing speed may be reduced, the first (claimed in said original application) consisting of a minimization of the loss of lift coefficient resulting from necessary up-elevator deflection by reduction in the longitudinal static stability parameter of the airplane to an unconventionally low value, and the second consisting in the use of a novel combination of landing flaps with pitch control flaps located near or at the tips of sweptback wing panels. The landing flaps increase the lift coefficient of the wing, but introduce an unwanted diving moment. The pitch control flaps are deflected upwardly to introduce a counteracting positive moment. These latter flaps, being typically located at the tips of a sweptback wing, have a greater moment arm than do the landing flaps, hence may be of lesser area than the landing flaps, and any loss of lift caused by their use is therefore less than the gain in lift owing to the landing flaps.

The present application deals particularly with the last-described concept, and the general object of the invention claimed herein may be stated as the provision of a combination of flaps capable of increasing the lift coefficient of a tailless airplane without introduction of a substantial diving moment.

For a full discussion of the manner in which the maximum available lift coefficient of a tailless airplane may be increased during the landing maneuver by use of a low static longitudinal stability parameter, see our said original application Serial No. 432,016, and our said continuation-in-part application Serial No. 547,594. The improvements provided by the invention claimed herein are applicable either in conjunction with or independently of the low longitudinal static stability parameter referred to in the foregoing, and a discussion of that concept will accordingly be omitted from the present application.

The present invention will be understood more fully by referring to the following detailed description of an illustrative tailless airplane in which the invention has been incorporated. For such purpose, reference is made to the accompanying drawings, in which.

Figure 1:
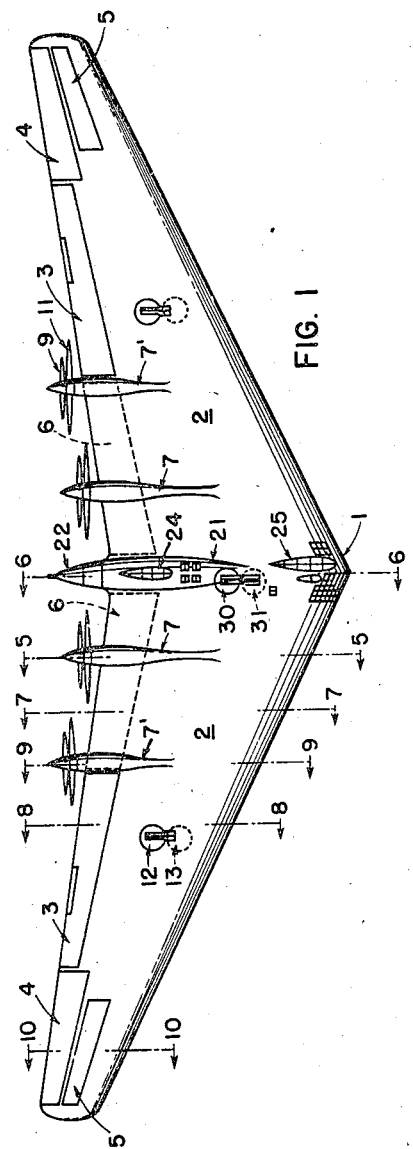
Fig. 1 is a top plan view of the military embodiment of our invention as set forth in the paragraph just above.
Figure 2:
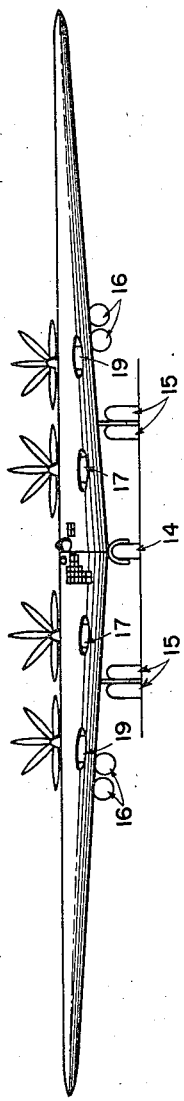
Fig. 2 is a front view of the airplane shown in Fig. 1.
Figure 3:
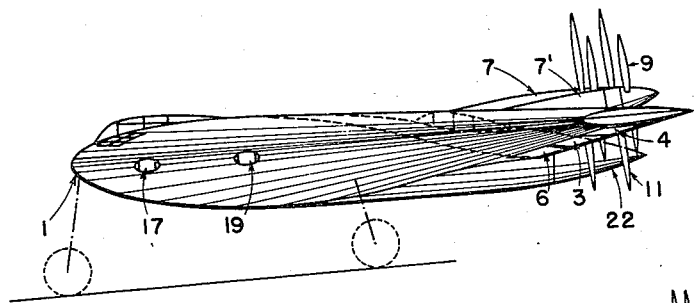
Fig. 3 is a side view of the airplane shown in Figs. 1 and 2, with the landing gear diagrammatically indicated in extended position.
Figure 5:
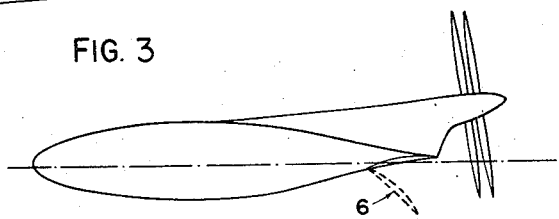
Figure 6:
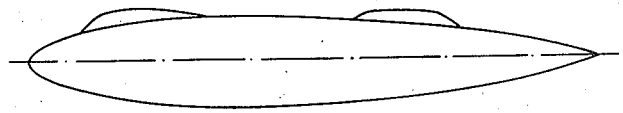
Figure 7:
Figure 8:
Figure 9:
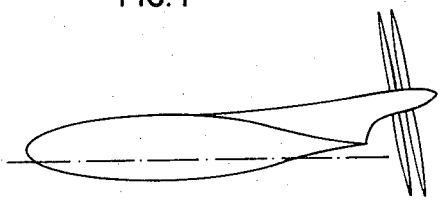
Figure 10:
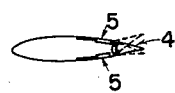

Figs. 5, 6, 7, 8, 9 and 10 are diagrams showing chord-section contours, taken as indicated by lines 5—5, 6—6, 7—7, 8—8, 9—9 and 10—10, respectively, in Fig. 1.

For the purpose of disclosing the invention, we have illustrated and will describe the low stability airplane disclosed and claimed in the aforementioned original application Serial No. 432,016, and the continuation-in-part application Serial No. 547,594. It will of course be understood, however, that this is for illustrative purposes only, and that the invention herein claimed is applicable to various other tailless airplanes having certain essential characteristics as will appear. The present somewhat detailed description of an illustrative airplane is therefore to be understood merely as descriptive of one typical airplane to which the invention may be applied with proven advantage, and no implied limitation thereto is to be inferred. With this understanding, we proceed to a description of the illustrative airplane mentioned.

The airplane illustrated has a substantially triangular planform with an angular nose 1 and sweptback wing panels 2, the latter preferably having wing profiles designed to have substantially zero center of pressure movement throughout all normal flight angles of incidence. This is illustratively and preferably, though not necessarily, accomplished by use of substantially symmetrical wing profiles from root to tip, giving substantially constant center of pressure positions one-fourth of the chord length back from the leading edge. In the illustrative airplane, the sweptback measured along the 25% chord line is substantially 22°, though this is subject to variation depending upon various design considerations, as will appear. The dihedral angle, also measured along the 25% chord line, may be substantially 2°, and the wing panels may have an aerodynamic washout of 4°, or somewhat less. The taper ratio in planform (ratio of root chord to tip chord) may be in the range from 3:1 to 6:1, being preferably and as here shown about 4:1. As here shown, the aspect ratio is about 7.4:1. The wing panels are tapered in both planform and thickness, the thickness of the root section, in percentage of chord, being about 19% in the present airplane, whereas the tip chord section is preferably of about 15% thickness. In accordance with the principles described in our said original and continuation-in-part applications, the wing is preferably structurally designed and loaded to locate its center of gravity not over from .01 to .03 of the mean aerodynamic chord of the wing forwardly of the aerodynamic center of the wing, giving a designed longitudinal static stability parameter of from .01 to .03. As already stated, these designed constants are given merely for the purpose of disclosing one typical airplane to which the improvements of the present invention may be applied. They are in no sense to be taken as limitative on the invention.

Each wing panel is shown as provided with a trailing edge elevator or "elevon" 3, located outboard of the later described propeller shaft housings. These elevons are so called because they combine the functions of elevator and aileron. Elevons 3 when moved in opposite directions for roll control operate in the manner of any ordinary trailing edge ailerons to control the airplane in roll, and when moved together in the same direction, operate as elevators. Linkages to accomplish such diversified control are well known in the art, and, per se, form no part of the present invention. Since elevons 3 are herein provided for the dual function of elevators and ailerons, elevator surfaces and aileron surfaces are identical and coextensive.

Pitch-control flaps 4 are incorporated in the trailing edges of the wing panels, outboard of the elevons, thus occupying positions on the tip portions of sweptback wing panels. These pitch-control flaps 4 are preferably designed for a maximum upward deflection angle of the order of 35° to 40°. If they are to be used additionally for trim purposes, as they may, provision may also be made for a downward deflection of up to approximately 10°.

Yaw control of any desired type may be employed, though we have here conventionally indicated rudders 5 located on the aft 40% of each panel near the tip and understood to be extensible simultaneously above and below the surface of the wing to produce drag and/or side force.

Occupying that portion of the span which lies inboard of the elevons, along the trailing edge of each wing-half, near the root thereof and, therefore, together forming a portion of the central area of the trailing edge region of the wing, is a pair of landing flaps 6—6, preferably, though not necessarily, of the conventional hinged "split" type. Thus each flap may be constituted of a portion of the lower skin of the wing, suitably braced and reinforced on its inner face and hinged suitably to a rearward semi-spar or the like.

These flaps 6—6 are mounted and operated for deflection in unison, but only in arcs lying below the lower surface of the wing, and for retraction into the plane of the lower skin of the wing. The maximum angle of deflection of these flaps, for an airplane embodying the present concepts and design factors, is on the order of not over substantially 60°. This maximum deflection is employed, of course, only in landing. Primarily, these flaps effectuate an increase in the lift coefficient of the airplane, but coincidentally they increase the drag and deceleration, and thus act as an aerodynamic brake or decelerator to steepen the angle of vertical approach.

For use in takeoff, these flaps may be deflected downwardly, but not to such an extent as in landing, e. g., not over about 10°, within which angle they do not increase the drag detrimentally. Hence, they increase the available lift coefficient, and permit taking off a large heavy tailless airplane with a short run, even over high obstacles.

In either case, however, the deflections of these flaps set up unbalanced negative pitching moments, and in order to counteract this effect, the pitch-control flaps 4 have been provided. These pitch-control flaps 4 are operable in the sense opposite to that of the deflection of the landing flaps 6—6, i. e., upwardly, whenever a net unbalanced pitching moment is set up by the operation of the landing flaps. The pitch-control flaps are primarily intended for operation with the landing flaps only on landing, but they may, as indicated, be used also on the takeoff, and in fact they may be used in cooperation with the elevators at any time desired. For instance, they may be used for trim purposes, deflected either in unison or differentially.

Attention is directed to the fact that the flaps 4, being mounted at the trailing edges of the tip regions of considerably sweptback wing panels, lie substantially farther aft of the airplane's center of gravity than do the landing flaps 6—6, and hence have a substantially longer moment arm than do the landing flaps, so they can be constructed smaller in both chord and span than the landing flaps, or with provision for substantially smaller deflection angles, or both, while still remaining entirely capable of operation to produce a stalling moment equal to any negative pitching moment resulting from use of the landing flaps. And being of considerably smaller area than the landing flaps, or used with smaller deflection angles, or both, their appropriate upward deflection in conjunction with any given downward deflection of the landing flaps will always leave a substantial net increase in lift coefficient. That is to say, their proper coordinated use with the landing flaps results always in a net increase in lift coefficient for landing and take-off, while counterbalancing any unbalanced pitching moments produced by the landing flaps.

Suitable control mechanism of any conventional character, unnecessary to illustrate herein, is provided for operating the landing flaps and pitch-control flaps in differential amounts, but simultaneously. The same mechanism, or same control, may operate both the pitch-control and landing flaps, or separate but simultaneously operable controls may of course be provided.

The use of the pitch-control flaps in cooperation with the landing flaps will now be evident. They are extended or deflected with the landing flaps to such deflection angles as balance the diving moments resulting from the extended flaps. At such angles they of course subtract somewhat from the lift coefficient, but in an amount that is small as compared with the increase in lift coefficient contributed by the landing flaps. A substantial net increase in lift coefficient, with no disturbance in moment coefficient, is thus obtained.

Certain of the major components or features of the illustrative airplane remain unmentioned, and will now be given brief attention.

Each wing panel of the airplane is provided with propeller shaft housings, an outboard housing 7, and in inboard housing 7', terminating in geared dual rotation pusher propellers 9 and 11, respectively, the engines being understood to be placed wholly within the wing section.

Each wing panel may also carry for military purposes an upper gun turret 12, and a lower gun turret 13. The wing also is provided with a retractable nose wheel 14 and with dual main wheels 15 retractable into the wing section, wheels 14 and 15 forming, when extended, a tricycle landing gear. Each wing panel may be provided with suitable racks for containing external bombs 16. The leading edge of each wing is shown as provided with inboard and outboard motor cooling air inlets 17 and 19, respectively.

Merging with the center section of the airplane is a main cabin 21 which may conveniently terminate rearwardly in a rear cannon turret 22. The cabin 21 is shown as provided with upper observation window 24. In the center section adjacent the leading edge may be a pilot enclosure 25, as well as suitable control windows, as indicated. Upper and lower gun turrets 30 and 31 may also be positioned ahead of cabin 21.

Figures 4, 4A:
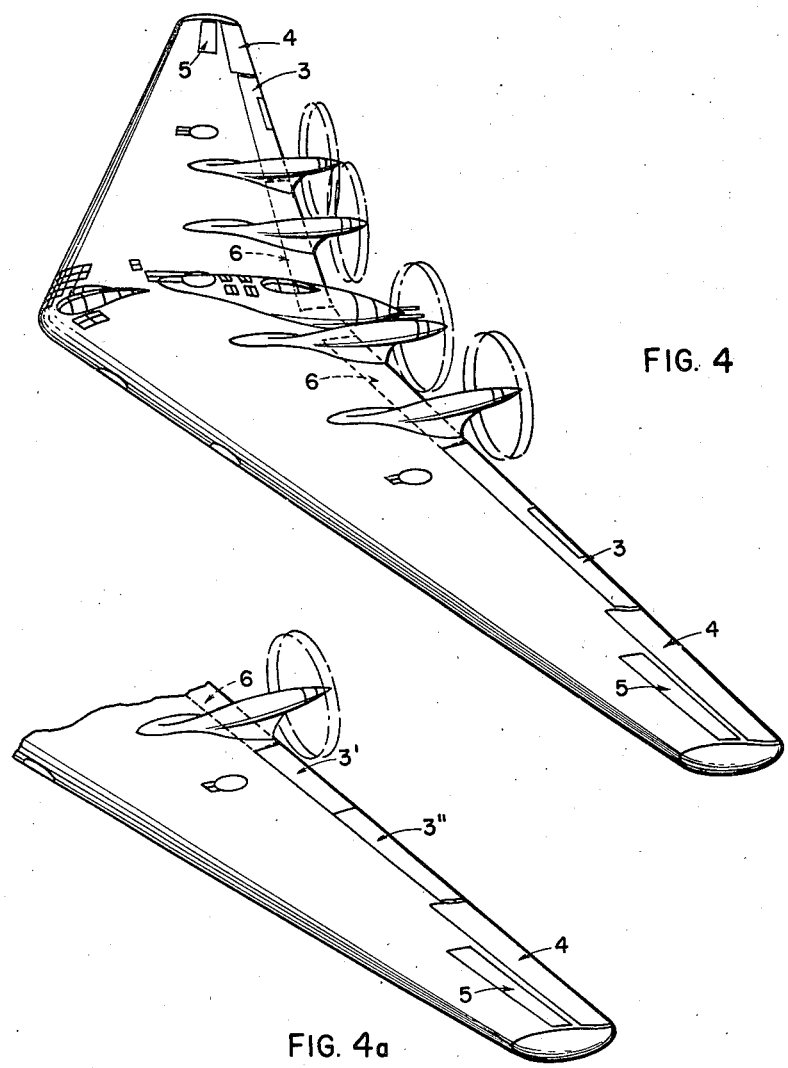
Fig. 4 is a three-quarters front perspective view of the airplane, that is, seen from above and in front in flight attitude.
Fig. 4a is a fragmentary perspective view of a modification of the control-and-stabilizing surfaces arrangement.

As shown in Fig. 4a, the present concepts also contemplate the substitution, if desired, for the elevons 3 (that is, the combined elevators and ailerons), of separate elevators 3' and ailerons 3''. In such case, the operation and functioning of the landing flaps are the same as hereinbefore described and the pitch-control flaps are located, operated and function in the same manner as in the previous embodiment. The separate ailerons produce no appreciable unbalanced pitching moments, either positive or negative. The elevators, in this case, are adapted to be operated in unison by forward and backward swinging of the control column and the ailerons by right or left rotation of the wheel on the control column. The landing flaps and the pitch-control flaps are adapted to be operated in unison in the manner described hereinbefore.

Having thus disclosed the inventive concepts and two embodiments thereof, what is claimed as new is:

1. In a tailless airplane having a sweptback wing, the combination of landing flaps hinged to the center section of said wing and forming a part of the trailing edge thereof, said landing flaps being deflectable downwardly to increase the lift and drag of the wing, elevator surfaces hinged to said wing laterally outwardly from the ends of said landing flaps, said elevator surfaces being operable to control the longitudinal attitude of the airplane, and pitch control surfaces pivotally mounted at the outer ends of said wing and spaced rearwardly of said landing flaps, said pitch control surfaces being deflectable simultaneously with said landing flaps and in the opposite direction therefrom to produce a pitching moment substantially equal to and opposite in sense from the pitching moment of the landing flaps.

2. In a tailless airplane having a sweptback wing, the combination of landing flaps hinged to the center section of said wing and forming a part of the trailing edge thereof, said landing flaps being deflectable downwardly to increase the lift and drag of the wing, elevator surfaces hinged to said wing laterally outwardly from the ends of said landing flaps, said elevator surfaces being controllable for longitudinal control of the airplane, and pitch control surfaces hinged to the outer ends of said wing and spaced rearwardly of said landing flaps, said pitch control surfaces being controllable independently of said elevator surfaces to produce a pitching moment substantially equal and opposite to the pitching moment produced by said landing flaps.

3. In a tailless airplane having a sweptback wing, the combination of landing flaps hinged to the center section of said wing and forming a part of the trailing edge thereof, said landing flaps being deflectable downwardly to increase the lift and drag of the wing, elevator surfaces hinged to said wing laterally outwardly from the ends of said landing flaps, said elevator surfaces being controllable for longitudinal control of the airplane, and pitch control surfaces hinged to the outer ends of said wing and spaced rearwardly of said landing flaps, said pitch control surfaces being controllable independently of said elevator surfaces for simultaneous deflection with and in opposite direction to said landing flaps whereby the diving moment produced by said landing flaps is substantially counterbalanced by the stalling moment of said pitch control flaps.

4. In a tailless airplane having a sweptback wing, the combination of landing flaps hinged to the center section of said wing and forming a part of the trailing edge thereof, said landing flaps being deflectable downwardly to increase the lift and drag of the wing, elevator surfaces hinged to said wing laterally outwardly from the ends of said landing flaps, said elevator surfaces being operable to control the longitudinal attitude of the airplane, and pitch control surfaces hinged to the outer ends of said wing and deflectable simultaneously with said landing flaps in the opposite direction thereto, said pitch control surfaces being of smaller area than said landing flaps but spaced appreciably further aft of the center of gravity of the airplane than said landing flaps whereby the sum of the aerodynamic force acting on the pitch control surface times the moment arm measured from the action line of that force to the center of gravity of the airplane is substantially equal and opposite to the sum of the greater aerodynamic force acting on the landing flaps times the lesser moment arm measured from the action line of that force to the center of gravity of the airplane.

JOHN K. NORTHROP.
WILLIAM R. SEARS.